United States Patent [19]

Plessis

[11] 3,867,691

[45] Feb. 18, 1975

[54] CAPACITIVE PROBE ROTATED BY AIR PRESSURE AND USED TO MEASURE INTERNAL DIAMETER OF A CYLINDER

[75] Inventor: Jean Max Plessis, Joue Les Tours, France

[73] Assignee: Commissariat A L'Energie Atomique, Paris, France

[22] Filed: Sept. 28, 1973

[21] Appl. No.: 401,989

[30] Foreign Application Priority Data
Oct. 6, 1972    France .............................. 72.35620

[52] U.S. Cl. ................................ 324/61 R, 317/246
[51] Int. Cl. ............................................ G01r 27/26
[58] Field of Search .......... 324/61 R, 61 P; 317/246

[56] References Cited
UNITED STATES PATENTS

| | | | |
|---|---|---|---|
| 2,417,062 | 3/1947 | Coake | 324/61 P |
| 3,176,286 | 3/1965 | Dschen | 324/61 P |
| 3,400,331 | 9/1968 | Harris | 324/61 P |
| 3,714,561 | 1/1973 | Jaquay | 324/61 P |

FOREIGN PATENTS OR APPLICATIONS

| | | | |
|---|---|---|---|
| 189,281 | 3/1957 | Austria | 324/61 P |
| 61,343 | 7/1948 | Netherlands | 324/61 P |

*Primary Examiner*—Stanley T. Krawczewicz
*Attorney, Agent, or Firm*—Cameron, Kerkam, Sutton, Stowell & Stowell

[57] ABSTRACT

The dimensions of the major axis and minor axis of the ellipse constituting the transverse cross-section of a tube are measured by means of a cylindrical probe engaged within the tube and capacitive transducers disposed on the probe along two axial and perpendicular reference planes. The ovalization test consists in subjecting the probe to a torque about its axis, in causing the two axial reference planes to coincide with the major axis and the minor axis of the ellipse and in measuring the distance between the tube wall and the transducers in the direction of the axes of the ellipse.

9 Claims, 4 Drawing Figures

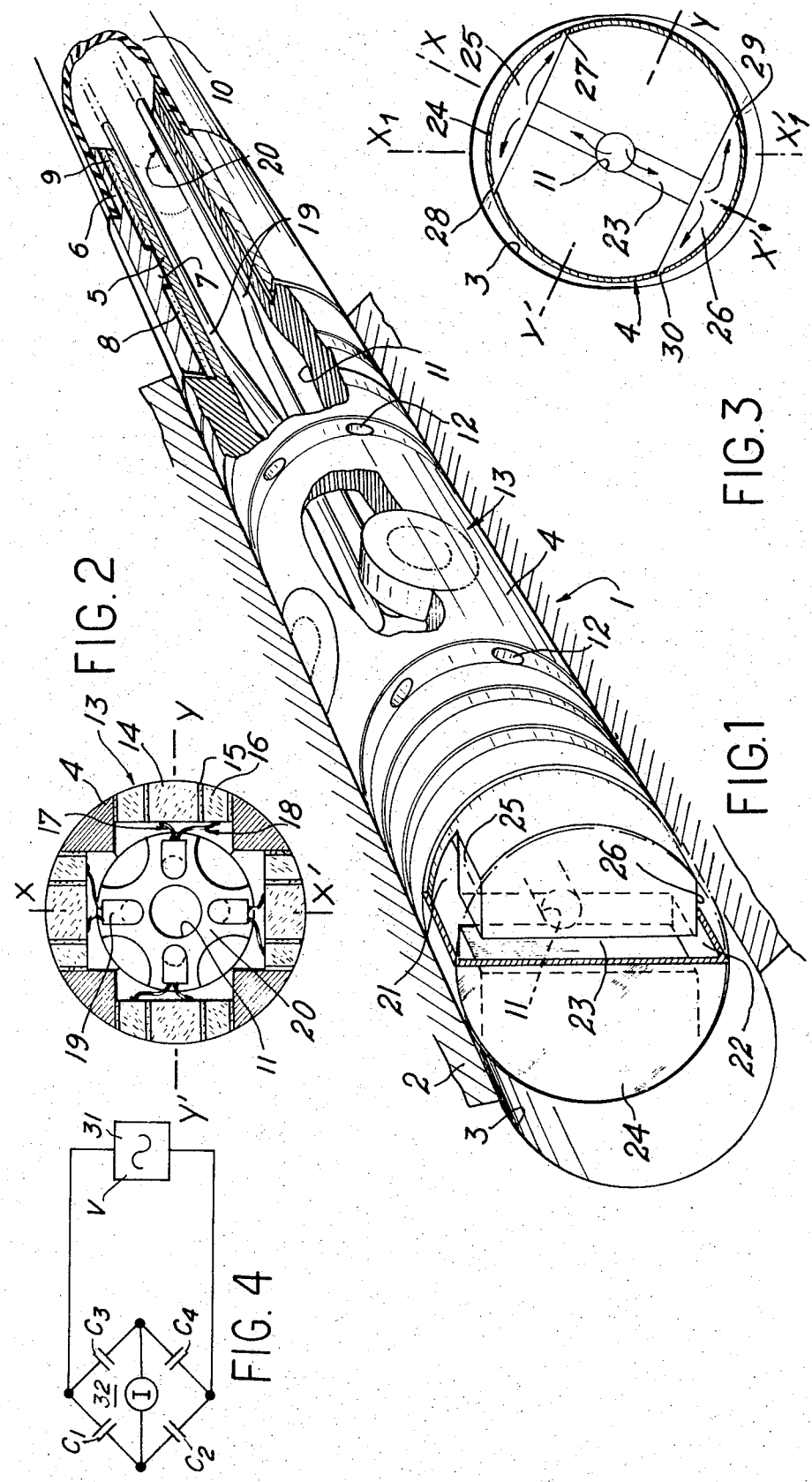

CAPACITIVE PROBE ROTATED BY AIR PRESSURE AND USED TO MEASURE INTERNAL DIAMETER OF A CYLINDER

This invention relates to a method for the measurement of variations in cross-section of a tubular element of substantial length and of very small diameter by means of an ovalization test, the tube being subject to a more or less marked degree of ovalization which may have a different orientation along the length of the element.

It is already a known practice to make use of measuring probes each consisting of a cylindrical casing of smaller diameter than that tubular element and capacitive transducers mounted in the external surface of the casing, each transducer being intended to deliver an electrical signal having a value which is a function of the distance between the internal wall of the tubular element and the transducer considered. Measurement of the variation in diameter of the element is performed by positioning the probe, especially by pneumatic means incorporated therein, along the axis of the tubular element at a predetermined point along the length of this latter, then by causing the element to rotate with respect to the casing and by recording the variations in the electrical signals delivered by the transducers.

In the method of measurement which has just been outlined, the essential difficulty lies in the need to rotate the tube with respect to the probe since this latter is connected to testing instruments outside the tube by means of transmission cables and ducts which make it possible in particular to displace the probe in sliding motion within the tube and to collect the electrical signals produced by the transducers while at the same time delivering the pressure of compressed air which is necessary to ensure sustentation of said probe in the axis of the tube irrespective of their relative positions. In point of fact, this rotation of the tube is not always possible, especially when said tube has a very small diameter and a very substantial length.

The present invention is directed to a method and a measuring probe which overcome the above-mentioned disadvantages by permitting self-orientation of the probe with respect to the tube along the axes of the ellipse which materialize the contour of the transverse cross-section of said probe as a result of its ovalization.

To this end, the method under consideration for ovalization testing of a tube by measurement of the dimensions of the major axis and the minor axis of the ellipse constituting the transverse cross-section of said tube along a plane at right angles to its longitudinal axis by means of a cylindrical probe engaged within the tube and adapted to carry capacitive transducers disposed on the probe along two axial reference planes located at right angles to each other, the probe aforesaid being provided with pneumatic sustentation means for causing the axis of the probe to coincide with the axis of the tube, is characterized in that it consists in subjecting the probe to a torque about its axis, in causing the two axial reference planes to coincide with the major axis and the minor axis of the transverse-section ellipse of the tube and in measuring the distance between the wall of the tube and the transducers in the direction of the axes of the ellipse.

The invention is also directed to a test probe for the practical application of the method hereinabove defined and comprising a cylindrical casing which is smaller in diameter than the tube to be tested, said casing being capable of sliding within said tube without coming into contact with its internal wall under the action of a pneumatic sustentation device which is incorporated in the casing and comprises an axial duct for the admission of compressed air into a distribution cavity formed within said casing, said axial duct being intended to communicate with radial ducts which are uniformly distributed about the axis of the casing and have their openings in the external surface thereof for discharging the air into the space formed between the casing and the tube wall, said casing being adapted to support at least two capacitive transducers disposed in the external surface of the casing in two axial reference planes located at right angles to each other. The probe is characterized in that the compressed-air distribution cavity also communicates with a transverse duct which is located at right angles to the axis of the casing and opens into two separate, flat lateral slits which are in parallel relation and located at right angles to one of the reference planes, said slits being equidistant from the other reference plane.

In a preferred embodiment of the invention, the casing is provided at the extremity which is remote from the axial duct for the admission of compressed air with two identical hollowed-out portions which are cut in the mass of the casing and located opposite to each other with respect to the axis of said casing, said hollowed-out portions being such as to cooperate with an end-cap which is fitted over said extremity so as to delimit in conjunction with two flat shouldered portions the lateral slits for the discharge of compressed air.

As an advantageous feature, the cylindrical probe casing is mounted at the end of a casing-holder by means of a rotary coupling so as to permit the relative rotation of the casing with respect to the casing-holder as a result of the action and reaction of compressed-air jets which are discharged through lateral slits in the internal wall of the tube. In particular, the rotary coupling can be constituted by a cylindrical sleeve placed externally around a bushing which forms an axial extension of the casing, said sleeve being provided with an inwardly projecting internal collar engaged in a circular recess formed on the bushing by two rings so as to secure the casing against translational motion while enabling it to move freely in rotational motion. The probe casing is preferably fitted with four capacitive transducers placed in diametrically opposite relation in pairs in the two axial reference planes, electrical connections between said transducers and a measuring instrument located outside the tube for collecting the signals produced being provided by electric leadout cables. In one arrangement which is known per se but advantageously employed in the probe according to the invention, the capacitive transducers are constituted by a central electrode surrounded by an insulating sleeve which is in turn surrounded by a guard and protection ring, measurement of the electric field produced being carried out between the central electrode and the opposite internal wall of the tube. The transducers are mounted within cylindrical recesses machined in the casing along two perpendicular diameters which correspond to the axial reference planes. The measuring instrument finally comprises a capacitance bridge having connections so arranged as to permit differential measurements in order to check the variations measured along the major axis and the minor axis of the transverse-section ellipse of the tube at the level of said transducers.

Further characteristic features of a test probe as constructed in accordance with the invention will become apparent from the following description of one exemplified embodiment which is given by way of indication without any limitation being implied, reference being made to the accompanying drawings, wherein:

FIG. 1 is a view in perspective in which the probe under consideration is shown in a position of engagement within a tubular element which is partly illustrated, with a view to measuring any ovalization exhibited by said tubular element at any point along its length;

FIG. 2 is a diagrammatic transverse sectional view of the probe casing at the level of the measuring transducers which are carried by the probe;

FIG. 3 is another sectional view looking on the end of the probe which is mounted within the tube; this view serves to explain the operation of the probe with greater clarity and in particular to show how selforientation of said probe is achieved inside the tube; and FIG. 4 is a circuit diagram for a measuring instrument used with the present probe.

In FIG. 1, the reference numeral 1 designates a measuring probe having a generally cylindrical shape and capable of sliding within a tubular element 2 which is assumed to be of very small diameter, especially of the order of or smaller than 10 mm and of very substantial length of the order of several meters. The probe 1 is intended to measure and to determine the degree of ovalization which is inevitable no matter what standard of accuracy is maintained in the fabrication of the internal wall 3 of the tube 2 as well as to measure the variations in said ovalization along the length of said tube, the probe being capable of sliding freely inside this latter. Said probe 1 is mainly composed of a cylindrical casing 4 having an axial extension at one end in the form of a bushing 5 which fits within the cylindrical collet 6 of a casing-holder. The connection between the bushing 5 and the collet 6 is formed by means of a rotary coupling constituted by a circular internal collar 7 which project inwardly from the collect 6, said internal collar being engaged within a recess formed on the external surface of the bushing 5 between two lateral rings 8 and 9. A connecting duct 10 is fixed on the rear end of the collect 6 of the casing-holder and traversed by electrical connecting cables 19, the intended function of which will be defined hereinafter. Said connecting duct serves at the same time as a duct for the supply of fluid under pressure and especially compressed air which is intended to carry out sustentation or lifting of the probe casing 4 within the tube 2 irrespective of the relative position of said casing. To this end, the duct 10 communicates with a cavity 11 which is arranged within the interior of the casing 4 and forms a manifold. By means of a series of radial ducts such as 12 which are uniformly spaced around the axis of the casing, said manifold communicates with the external surface of said casing within the space formed between this latter and the internal wall 3 of the tube 2. The air cushion which is thus formed and continuously maintained within said space enables the casing 4 and the duct 10 which forms an extension of this latter towards the exterior to float freely within the tube 2 in such a manner as to bring the axis of the tube into substantially coincident relation with the axis of the casing.

In accordance with one arrangement which is conventional in itself, the measurement of ovalization of the wall of the tube 2, that is to say the measurement of variations in diameter of the tube as measured with respect to its longitudinal axis is carried out with the aid of the probe 1 by means of capacitive transducers such as 13 mounted in cylindrical recesses which are suitably machined in the external wall of the probe casing 4. As an advantageous feature and in the example of construction under consideration, the casing 4 is provided with four capacitive transducers arranged in pairs along two perpendicular diameters as illustrated in greater detail in the sectional view of FIG. 2.

From this figure, it is apparent that the four transducers 13 are in fact carried by the casing 4 in such a manner as to be located in opposite relation in two axial reference planes as defined in the sectional view of this figure on the one hand by the line X–X' and on the other hand by the line Y–Y'. Each transducer 13 is made up of a central electrode 14 formed especially of copper and surrounded by an insulating sleeve 15 which is in turn surrounded by a second peripheral electrode 16 constituting a guard ring. By means of said second electrode, the lines of the electric field between each transducer and the wall 3 are permitted to be wholly perpendicular to the central electrode 14 in the zone of this latter. Electric lead wires 17 and 18 are soldered respectively on the internal face of the central electrode 14 and on the guard ring 16, said lead wires being insulated with respect to each other and joined together inside the different connecting cables 19 which extend from the casing 4 into the duct 10 towards the exterior of the tube 2 and serve to connect the transducers to a measuring instrument 31 in FIG. 4 which advantageously comprises a capacitance bridge 32 for the four transducers 13 shown at $C_1 - C_4$ of the probe and a conventional source of alternating voltage I. The cables 19 are secured within an internal supporting member placed within the cavity 11 in which the probe sustentation are is collected, said supporting member being so designed as to have in particular the shape of a recessed cruciform spider 20, the profile of which is illustrated in FIG. 2.

Referring again to FIG. 1, it is seen that in accordance with the invention, the casing 4 of the probe 1 is provided at the end remote from the compressed-air duct 10 with two identical hollowed-out portions 21 and 22 respectively which are diametrically opposite to each other with respect to the axis of the casing and machined in the mass of this latter. Said hollowed-out portions are joined to each other by means of a transverse channel 23 which is cut in the corresponding end of the casing 4 at right angles to its longitudinal axis and are covered with an end-cap 24 so arranged as to determine four lateral slits in the external surface of the casing in conjunction with two flat shouldered portions 25 and 26 which are formed within said hollowed-out portions so as to permit the discharge of part of the compressed air derived from the manifold 11 which communicates directly with the transverse channel 23.

As illustrated more specifically in FIG. 3, provision is made for cavities 25 and 26 which are defined between on the one hand the end-cap 24 on the other hand the hollowed-out portions 21 and 22 formed at the end of the casing 4. Said cavities have openings towards the exterior in the form of four lateral slits arranged in opposite pairs designated respectively by the reference numeral 27 and 28 in the case of the cavity 25 and by the numerals 29 and 30 in the case of the cavity 26. The compressed air which escapes radially from said cavities then acts directly on the opposite surface of the wall 3 of the tube 2 so as to generate two opposing torques which produce action in much the same manner as two compressed-air reaction wheels, and result in automatic self-orientation of the probe with respect to the axes of the ellipse by virtue of the rotary coupling provided between the casing and its casing-holder. Taking into account the elliptical shape of the tube 2, it is in fact apparent that the air jet which is discharged through the slit 27, for example, will apply a greater force to the oppositely-facing internal wall of the tube 2 than the force arising from the opposite jet which is discharged from the slit 28 since the corresponding distances are not equal. The action of the first jet on said wall is therefore greater than the reaction of the second jet on the same wall; the same applies to the jet 30 and the jet 29 but in opposite directions. As a general consequence, torque is exerted on the casing 4 about its axis which coincides with the axis of the tube 2; thus the reference plane X–X', for example, which is oriented in the direction of the transverse channel 23 and located at right angles to the jets 27 to 30 is caused to coincide with the major axis X1, X'1 of the ellipse formed by the cross-section of the tube. Ipso facto, the second reference axis Y–Y' of the casing which is not shown in FIG. 3 comes into coincident relation with the minor axis of the ellipse.

Measurement of the distances which then exist between the capacitive transducers 13 which are mounted within the casing 4 along the aforesaid reference planes of the wall of the tube 3 can be carried out by the capacitance bridge of the measuring instrument. By mounting this instrument in a suitable manner and especially as a capacitance bridge, it is then possible to determine with precision the differences in distance between the tube and the casing as measured along the major and minor axes of the ellipse and consequently to determine the exact ovalization of the tube in each position of the probe along the length of this latter. The assembly which is thus formed is of very simple design and offers the advantage of immediate self-orientation of the probe which carries the capacitive transducers with respect to the tube irrespective of the position of the casing which carries said transducers within said tube. It is worthy of note that the presence of a rotary coupling between the casing and the casing-holder on which the compressed-air supply duct is fixed eliminates the restoring torque which would arise from the stiffness of said duct in torsion. In the alternative embodiment which is illustrated, there only remains the torque arrising from the electrical connecting cables 19 between the electrodes of the transducers and the measuring instrument; this torque can be considerably reduced by making use of an air supply duct 10 having a length which is slightly shorter than that of the cables. The device which has been described makes it possible in addition to avoid the need to displace the tube itself in rotational motion; the tube can thus remain wholly stationary and can consequently be of much greater length while having a diameter which can on the contrary be very small and limited solely by the possibilities of miniaturization of the probe.

By way of indication, probes 5.5 mm in diameter and adapted to the testing of tubes 5.7 mm in diameter have been constructed in accordance with the invention, the precision achieved being of the order of 0.03 mm.

It is readily apparent that the invention is not limited solely to the exemplified embodiment which has been more especially described with reference to the accompanying drawings but extends on the contrary to all alternative forms.

What we claim is:

1. A method for ovalization testing of a tube of small diameter and substantial length by measurement of the dimensions of the major axis and the minor axis of the ellipse constituting the transverse cross-section of said tube along a plane at right angles to its longitudinal axis by a cylindrical probe within the tube and capacitive transducers disposed on the probe along two axial reference planes located at right angles to each other, said probe being provided with pneumatic sustentation means for causing the axis of the probe to coincide with the axis of the tube, the steps of subjecting the probe to a torque about its axis, causing the two axial reference planes to coincide with the major axis and the minor axis of the transverse-section ellipse of the tube and then measuring the distance between the wall of the tube and the transducers in the direction of the axes of the ellipse.

2. A test probe for ovalization testing of a tube comprising a cylindrical casing smaller in diameter than the tube to be tested, said casing sliding within said tube without contact with the internal wall of said tube, a pneumatic sustentation device incorporated in the casing and maintaining the separation of said tube and said casing including an axial duct for the admission of compressed air into a distribution cavity formed within said casing, said axial duct communicating with radial ducts uniformly distributed about the axis of said casing and opening in the external surface thereof for discharging the air into the space formed between said casing and the tube wall, at least two capacitive transducers supported on said casing disposed in the external surface of the casing in two axial reference planes located at right angles to each other, said compressed-air distribution cavity communicating with a trnasverse duct located at right angles to the axis of said casing, said transverse duct opening into two separate, flat lateral slits in parallel relation and located at right angles to one of the reference planes, said slits being equidistant from the other reference plane.

3. A test probe according to claim 2, including two identical hollowed out portions in said casing at the extremity which is remote from the axial duct for the admission of compressed air cut in the mass of the casing and located opposite to each other with respect to the axis of said casing, said hollowed out portions cooperating with an end-cap fitted over said remote extremity to define in conjunction with two flat shouldered portions said lateral slits for the discharge of compressed air.

4. A test probe according to claim 2, including a casing holder mounting said cylindrical probe casing, a rotary coupling at the end of said casing holder engaging said casing to permit the relative rotation of said casing with respect to said casing holder under the action and reaction of compressed air jets discharged through said lateral slits.

5. A test probe according to claim 4, said rotary coupling including a cylindrical sleeve place externally around a bushing forming an axial extension of the casing, an inwardly projecting internal collar for said sleeve engaged in a circular recess formed on said bushing, on said bushing forming said recess to secure said casing against translational motion while enabling said casing to move freely in rotational motion.

6. A test probe according to claim 2, including four capacitive transducers on said probe casing disposed in diametrically opposite relation in pairs in the two axial reference planes and electrical connections between said transducers and a measuring instrument located outside said tube for collecting the signals from said transducers.

7. A test probe according to claim 6, said capacitive transducers including a central electrode surrounded by an insulating sleeve, a guard and protection ring around said sleeve, measurement of the produced electric field being between said central electrode and the opposite internal wall of said tube.

8. A test probe according to claim 6, said transducers being mounted within cylindrical recesses in said casing along two perpendicular diameters corresponding to the axial reference planes.

9. A test probe according to claim 6, said measuring instrument including a capacitance bridge having connections disposed for differential measurements to check variations measured along the major axis and the minor axis of the transverse-section ellipse of said tube at the level of said transducers.

* * * * *